| United States Patent [19] | [11] Patent Number: 4,778,857 |
| --- | --- |
| Graves et al. | [45] Date of Patent: Oct. 18, 1988 |

[54] UNCURED RUBBER COMPOSITIONS CONTAINING AROMATIC FURAZAN OXIDES

[75] Inventors: Daniel F. Graves, Clinton; Walter R. Hausch, Akron, both of Ohio

[73] Assignee: The Firestone Tire & Rubber Company, Akron, Ohio

[21] Appl. No.: 54,971

[22] Filed: May 28, 1987

Related U.S. Application Data

[63] Continuation of Ser. No. 380,193, May 20, 1982, abandoned.

[51] Int. Cl.$^4$ ............................................. C08C 19/08
[52] U.S. Cl. ........................... 525/375; 260/DIG. 43; 525/348
[58] Field of Search ............... 525/375, 377, 381, 347, 525/348; 260/DIG. 43

[56] References Cited

U.S. PATENT DOCUMENTS 2,974,120  5/1961  Miller ..................................... 524/95
3,931,106  1/1976  Crosby .................................. 525/375
4,024,327  5/1977  Diefenbach ......................... 525/375

FOREIGN PATENT DOCUMENTS 1586861  3/1981  United Kingdom ............... 525/375

OTHER PUBLICATIONS

Rehner, Jr. et al., Vulcanization React. in Butyl Rubber, Ind. and Eng. Chem., 38, pp. 500–506.

*Primary Examiner*—Christopher Henderson
*Attorney, Agent, or Firm*—Daniel N. Hall

[57] ABSTRACT

Uncured rubber compositions containing fused aromatic furazan oxides exhibit improved processability and reduced viscosity. Useful furazan oxides have both carbons of the furazan ring as part of a fused aromatic ring and include benzofurazan oxide and its methyl and methoxy analogs. Improvements in processability, green strength and liquification of NR can be achieved through use of these furazan oxides in uncured rubber compositions.

3 Claims, No Drawings

UNCURED RUBBER COMPOSITIONS CONTAINING AROMATIC FURAZAN OXIDES

CROSS REFERENCE TO RELATED APPLICATIONS

This application is a continuation of copending application Ser. No. 380,193 filed May 20, 1982, now abandoned.

This invention relates to uncured rubber compositions. More particularly, it relates to uncured compositions exhibiting improved properties and containing aromatic furazan oxides. It also relates to methods of improving the processability, green strength and viscosity properties of uncured rubber compositions.

BACKGROUND OF THE INVENTION

It is well-known that, with very few exceptions, rubber compositions are combined with various other materials before being cured and/or put into use. Some of these added materials improve the properties of the end product in service while others improve processing properties of the uncured compositions. In some instances, both effects may be achieved. It is also known that the various chemicals, pigments and other materials so used, both organic and inorganic, can interact in various ways to produce desirable or deleterious effects. For further discussions of rubber processing and materials used therein, see, for example, *Encyclopedia of Polymer Science and Technology*, published by John Wiley and Sons, New York (1970), particularly volume 12, page 280 and *The Vanderbilt Rubber Handbook*, R. T. Vanderbilt Company, Norwalk, Conn., 06855 (1968), particularly Sections 6, 7 and 8, beginning at page 337.

Benzofurazan oxides, and their analogs and isomers are known compounds, and many descriptions of them and procedures for their preparation have appeared. See, for example, Kaufman, et al., "Chemical Reviews," volume 9, page 429 and following (1959) and Mallory, et al., "Organic Synthesis" collective volume IV, pages 74 and 75, John Wiley and Sons, New York (1963). The following U.S. Patents also described procedures for preparing furazan oxides for various types: U.S. Pat. No. 4,185,018 to Fah; U.S. Pat. No. 3,528,098 to Shaw; and U.S. Pat. No. 2,424,199 to Ter Horst. In considering previous descriptions of furazan oxides and related compounds, it should be noted that nomenclature used for these compounds has not been consistant, in part due to uncertainty as to their structures and predominant isomeric form. For example, they have been described as furazan oxides, as ortho dinitroso benzenes or di (nitrile oxides). At other points, they have been referred to as isobenzofuroxanes, benzofuroxans, benzofurazan-N-oxides and benzofurazan oxides. It is believed that the latter term is the modern and preferred nomenclature, and it shall be used in this specification and the appended claims.

Studies of furazan oxides and related compounds in rubber have been reported. For example, Rehner and Flory state in *Industrial and Engineering Chemistry*, volume 38, page 500 et sec, that ortho dinitroso benzene is inactive in butyl rubber as a vulcanizing agent. In contrast, the para isomer is said to be very active by Rehner and Flory. U.S. Pat. No. 3,931,121 to Davis, et al., describes the curing of elastomer polymers with poly (chloronitroso) compounds. U.S. Pat. No. 3,931,106 to Crosby, et al., describes the use of dinitrile oxides, which can be generated in situ from furazans, in rubber cross-linking. In this regard, it should be noted that the aromatic furazan oxides of this invention cannot isomerize to di(nitrile oxides) because the bond between the adjacent carbon atoms is part of an aromatic ring. U.S. Pat. No 2,974,120 to Miller describes the use of nonaromatic furoxans as antioxidants and antidegradants in rubber. U.S. Pat. No. 2,905,582 to Coleman, et al., describes the use of nitroso compounds, including dinitroso compounds wherein the nitroso groups are on nonadjacent carbons in a method for bonding polyurethane resin to rubber bodies. Morita has described the use of N, 4-dinitroso-N-methyl aniline as an active chemical promoter for carbon black reinforcement of IIR, NR and SBR. See *Rubber Chemistry and Technology*, volume 49, page 119 and following (1976). Tanaka, et al., have reported studies of nitroso benzene in rubber where chain cleavage was observed in Kogyo Kagaku Zasshi 74(8), pages 1701-6 (1971).

SUMMARY OF THE INVENTION

According to this invention, uncured rubber compositions comprising at least one rubber having an unsaturated carbon chain and minor, property-improving, amounts of at least one aromatic furazan oxide of a partial formula

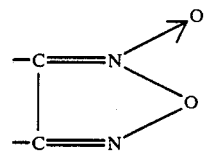

wherein the depicted carbon atoms are part of a fused aromatic ring, are improved in processability and/or green strength. Such compositions may also exhibit desirably reduced viscosity and other beneficial properties. The invention includes methods of improving processability, enhancing green strength and reducing viscosity of uncured compositions by adding aromatic furazan oxides to them. Liquid rubber compositions are also within the scope of the invention.

DETAILED DESCRIPTION OF THE INVENTION

The rubber compositions of this invention are not cured, that is, they are uncured and not vulcanized. In some instances, they contain curing agents (systems) and thus are curable of being cured. In other words, they are vulcanizable. In other instances, the compositions of this invention do not contain curing agents, either because they are intermediate compositions to which a curing system will be, but not yet have been, added or because they are to be put in use without the addition of curing agents in such applications as sealants, caulks, adhesives and the like. In any event, the invention includes uncured rubber compositions containing aromatic furazan oxides whether or not they contain, in addition, curing agents, and whether or not they are intermediates to which curing agents are to be added.

Said curing agents, when present, are of the conventional type such as sulfur- or peroxide-based curing systems and the like. They are used in conventional amounts and incorporated in the uncured compositions of this invention by known techniques and procedures. Fillers (pigments) may be, and often are present as is known to those skilled in the art. Typical fillers include carbon black in its various forms, glass, silica, talc and similar finely divided mineral materials.

The rubbers used in the uncured compositions of this invention have unsaturated carbon chains. That is, their polymer backbones contain a significant amount of unsaturation, in contrast to the pendent or vinyl saturation is found in some other types of rubbers. Typically, the chains of such unsaturated rubbers have at least about 20% of their carbon to carbon bonds as unsaturated bonds. Characterization of rubber as having unsaturated carbon chains it well-known in the art as shown by ANSI/ASTM Standard D 1418-79A where unsaturated-chain rubbers are referred to as R rubbers. Class R rubbers include natural rubber and various synthetic rubbers derived at least partly from diolefins. The following is a non-exclusive list of R class rubbers which can be used in the compositions of the present invention:

ABR—Acrylate-butadiene
BIIR—Bromo-isobutene-isoprene
BR—Butadiene
CIIR—Chloro-isobutene-isoprene
CR—Chloroprene
IIR—Isobutene-isoprene
IR—Isoprene, synthetic
NBR—Nitrile-butadiene
NCR—Nitrile-chloroprene
NIR—Nitrile-isoprene
NR—Natural rubber
PBR—Pyridine-butadiene
PSBR—Pyridine-styrene-butadiene
SBR—Styrene-butadiene
SCR—Styrene-chloroprene
SIR-Styrene-isoprene rubbers.

Of these, compositions where the rubber is NR, IR, BR, SBR, CR, CIIR, NIR or mixtures of two or more of these are typically used. Many compositions are made wherein the rubber is NR, SBR or a mixture containing at least about 50 percent of one of these. Compositions containing only NR as the rubber portion are often used. In the context of this invention, NR includes both heava and guayule rubber as well as mixtures thereof.

The compositions of the present invention can also contain materials used in conventional rubber formulations such as antioxidants, accelerators, retarders, promoters and the like in addition to the curing systems and fillers noted above. It should be noted, however, that it is sometimes desirable to choose such materials with care since they may interact with the essential furazan oxides.

The furazan oxides used in the vulcanizable compositions of this invention are fused aromatic, that is, they have an aromatic ring fused to the N-oxidized heterocyclic furazan ring. They are of the partial formula

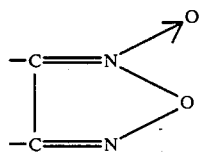

wherein the depicted carbon atoms are part of a fused, single aromatic ring. This aromatic ring can be carbocyclic such as a benzene ring or it may be heterocyclic, such as a pyridine ring. It can be the only other ring in the furazan compound, or it can be part of a linked or fused ring system. It is only necessary that both depicted carbon atoms be part of the same aromatic ring.

Examples of the furazan oxides useful in the compositions of this invention are those that can be represented by the formulae

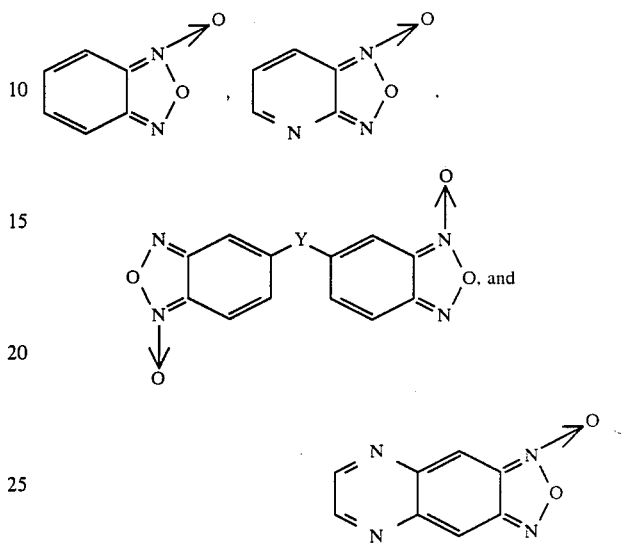

wherein none, one or any two of the ring positions can be substituted with lower hydrocarbyl, halogen, hydroxyl, lower hydrocarbyl oxy, lower hydrocarbyl thio, lower hydrocarbyl carbonyl, carbonyl lower hydrocarbyl oxy, nitro, amino or amine groups and Y is a linking atom or group. In this context, lower hydrocarbyl refers to groups of carbon and hydrogen having eight or less carbon atoms such as methyl, ethyl, butyl, pentyl, heptyl, octyl (all isomers). Linking atoms or groups include ether, thio ether, sulfoxide, sulfone, amine, methylene and the like (including simple covalent bonds such as found in biphenyl) and the other linking groups shown in U. S. Pat. No. 3,528,098 (which is incorporated by reference herein for its disclosures in this regard). Hydrocarbyl-oxa, hydrocarbyl this and mixed hydrocarbyl oxa-thia substitutents are also possible where the hydrocarbyl groups are typically lower alkylene moieties. Such are often made from glycols, dithiols, epoxides and episulfides. Often the furazan oxide is a benzofuran oxide of the formula

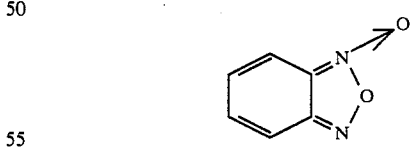

wherein none, one or any two of ring positions can be substituted with lower hydrocarbyl, halogen, low hydrocarbyl oxy, lower hydrocarbyl thio, lower hydrocarbyl carbonyl, carbonyl lower hydrocarbyl oxy, nitro, amine or amino groups. Typically, the furazan oxide is benzofuran oxide or the methyl or methoxy analog thereof.

Methods for preparing, purifying and handling these compounds are known to the art as is shown by the references cited hereinabove. It should be noted that some of these furazan oxides, particularly those containing relatively large amounts of nitrogen and oxygen, such as benzotri(furazan oxide) and 4,6-di(nitro)benzofuran oxide, are prone to rapid decomposition to the point of explosions; all may be physiologically active to varying degrees. Therefore, care in their handling and use should be exercised.

The compositions of the present invention can be prepared by conventional techniques using various types of mills, blenders and mixers known to the art. Usually the amount of furazan oxide used is a property-improving amount, such as an amount which will improve the processability of the composition and, in certain instances, its green strength and viscosity properties. Processability properties are those related to the ease and efficiency of mixing, mastication and handling of a rubber composition in its unvulcanized, that is, uncured state. They include viscosity and often the speed and efficiency with which various other components are dispersed in the rubber. Typically, this property-improved amount will range from about 0.01 to 10 parts per 100 parts (by weight) rubber (phr). Often the furazan oxide will be used in an amount ranging from 0.5–5 phr. The temperatures used in formulating the rubber compositions of this invention range from ambient to those normally used in the art, such as 75 degrees to 175 degrees. In its broader aspects, the formulations can be made from about 20 degrees to 220 degrees. Although in many instances, narrower temperature ranges such as about 50 degrees to 190 degrees are employed.

Among the desirable and beneficial properties exhibited by the compositions of the present invention are improved processability, enhanced green strength and in some instances reduced viscosity. Compositions containing substantial amounts (greater than 50 percent) of NR, IR or CR show improved processability and enhanced green strength. Improved processabilty of uncured rubber formulations is often desirable because it permits savings in energy and time while compounding and subsequent processing of the rubber by techniques such as calendering, milling, remilling, extrusion and the like. Such savings are important in the current period of shortages and rising costs. In general processability is an inclusive term used also to describe the decreased viscosity and/or high green strength such as found in the compositions of this invention. Heretofore, it has often been found that decreasing viscosity of an uncured composition also results in decreased green strength. Similarly, increasing green strength has been found to increase viscosity. It is a particularly desirable feature of the compositions of the present invention that viscosity reductions are achieved in combination with green strength increases.

In general, NR, IR and CR containing compositions show viscosity reductions of about 20 Mooney units for about 0.5–1.5 phr furazan oxide with accompanying increases in green strength of about 20–100 psi. Similar levels of furazan oxide in synthetic rubbers such as, for example, SBR show Mooney viscosity increases of about 10 units while when peak green strength is increased about 5–50 psi. With higher levels of furazen oxides (e.g. 2–5 phr), the extreme in viscosity reduction can be reached with liquefaction of NR and IR. Such liquid rubbers are useful in sealants and as processing aids where they are combined with other types of rubber to aid in plasticizing rubber. Liquid rubbers, also known as depolymerized rubber (DPR), are well-known in the art and need not be further described here. It is sometimes found that the viscosity reductions observed in the compositions of the present invention are accentuated by the inclusion of antioxidants and materials such as carbon black and silica which are believed to interact and trap polymer free radials prior to their cross-linking. Thus maximum viscosity reductions can usually be achieved by adjusting the concentrations of the furazan oxide and the antioxidant or radial trapping materials (fillers) in a given rubber composition.

EXAMPLES

The following, nonlimiting examples exemplify the practice of the invention and include the best mode presently known. In these examples, as elsewhere in the specification and claims, all parts and percentages are by weight (pbw), unless specified otherwise, and temperatures are in degrees centigrade. Conventional rubber compound materials, conditions, temperatures, procedures and evaluation techniques are used unless noted to the contrary.

In the following examples, an internal mixer, such as a Brabender or small size Banbury mixer, was used. The usual technique was to add various materials, often in portions, to the mixer and continue mixing for the indicated time period. Further additions followed by mixing are then made to the masterbatches thus prepared. The standard technique was according to the following schedule:

| TIME, (Min) | ADD TO MIXER |
|---|---|
| 0 | Polymer, 100 parts |
| .5 | half charge filler plus furazan oxide |
| 1.5 | Balance filler plus zinc oxide, stearic acid |
| 3.0 | Processing oil |
| 6.0 | Drop mixed composition at 160–170° F. |

The uncured masterbatch was then immediately banded and sheeted on a small twin roll mill set at 60 gauge. Mooney viscosities were measured using the large rotor in a four minute cycle at 100 degrees. This procedure was used to make masterbatches from NR (Hevea) and SBR (trade name Duradene, available from The Firestone Tire & Rubber Company, Akron, Ohio, USA).

EXAMPLE ONE

A series of typical tire belt skim formulations were prepared using 100 percent natural rubber containing zinc oxide (5 phr), stearic acid (2 phr), carbon black (40 parts) and varying amounts and types of furazen oxides. Each was mixed 5 minutes and dropped at 143°. The additives used and results were as follows

| Stock | Additive Type | A-mount | Mooney Vis | Green Strength, psi init[f] | peak[d] | Elong[e] |
|---|---|---|---|---|---|---|
| Control | — | — | 41 | 25 | 135 | 810 |
| IA | BFO[a] | 1 | 28 | 20 | 340 | 670 |
| IB | MBFO[b] | 1 | 24 | 25 | 300 | 650 |
| Comparision | Pepton 44[c] | 1 | 26 | 25 | 80 | 735 |

[a] benzofurazan oxide
[b] 6 - methyl benzofurazan oxide
[c] Pepton 44, a commercial peptizer sold by American Cyanamid Co.,
[d] break same as peak
[e] percent elongation
[f] at 50% elongation As can be seen from the preceeding Table, stocks IA and IB, both of which contained furazan oxides, exhibited decreased Mooney viscosities and, at the same time, increased green strengths.

EXAMPLE TWO

A SBR-based passenger tire tread stock composition was prepared containing about 60 phr carbon black and conventional amounts of zinc oxide, stearic oxide and a waxy antioxidant. A similar formulation containing in addition 1.0 phr benzofuran oxide was prepared under comparable conditions. The Mooney viscosity of the control was 60.0 and of the furazan oxide containing composition, 68.9. The green stress-strain properties of the two compositions were as follows:

|  | Control | Control Plus BFO |
|---|---|---|
| Initial | 33 | 50 |
| Peak | 43 | 84 |
| Break | 27 | 84 |
| Elongation, % | 545 | 570 |

EXAMPLE THREE

A NR composition was prepared containing about 40 parts ISAF black, about 20 parts Hi-sil silica and conventional amounts of zinc oxide, antioxidants, softener, resin, sulfenamide accelerator, sulfur and retarder. An essentially identical composition was prepared containing, in addition, 1 phr benzofurazan oxide. The control had a Mooney viscosity of 64.4 and the furazan oxide formulation, a viscosity of 49.0. Thus, 1.0 part furazan oxide causes a 15 unit decrease in viscosity under identical mixing conditions.

EXAMPLE FOUR

Two typical truck tire tread compositions were prepared from grade B NR containing silica filler (about 80 phr Hi-sil silica). Conventional amounts of silane coupling agent, plasticizer, antioxidant, processing oil, sulfur, accelerator, retarder, resin and activator were also included. The composition without furazan oxide was hard to mix in a 1.3 kg Banbury and when dropped was very dry, stiff and had the appearance of sawdust. A second compound of the same formula containing, in addition, 1 phr benzofuran oxide was ready to drop after only six minutes of mixing but was given the same 12 minute mix as the control. It dropped smoothly from the Banbury and was not stiff.

EXAMPLE FIVE(A)

A series of rubber compounds based on IR was prepared. The compounds were free of filler and curing agents; they contained varying amounts of methyl benzofurazan oxide, ranging from 0 to 2.5 phr and, in some instances, 2.0 phr commercial antioxidant (Santoflex 13). Each was mixed 6 minutes at 150° F. and then the Mooney viscosity determined. The results are shown in Table 5A. As can be seen, with the compounds containing no antioxidant, viscosity increases up to 1.5 phr furazan oxide and then falls sharply. This increase is believed to be due to cross-linking reactions which compete with chain scission. At high levels of furazan oxide scission overtakes cross-linking and viscosity reduction results. Other observations revealed that in the presence of carbon black viscosity increases do not occur. Rather, only a steady decrease in viscosity with increasing furazan oxide is observed.

In the stocks containing both furazan oxide and antioxidant, a similar steady decrease in viscosity was observed. It is believed that the antioxidant impedes cross-linking and the decrease due to chain scission is evident.

TABLE 5A

| Additive, phr | | |
|---|---|---|
| MBFO | SANTOFLEX 13[a] | Mooney Vis., 100° |
| 0 | 0 | 40 |
| 0.5 | 0 | 46 |
| 1.0 | 0 | 53 |
| 1.5 | 0 | 55 |
| 2.5 | 0 | 19 |
| 0 | 2.0 | 70 |
| 1.0 | 2.0 | 40 |
| 2.0 | 2.0 | 19 |

[a] A commercial antioxidant available from the Monsanto Chemical Co. of St. Louis, Missouri, USA.

EXAMPLE 5(B)

A similar series of rubber compounds based on SBR was prepared containing methyl benzofurazan oxide and, in some instances, Santoflex 13. In the absence of the latter, a steady increase in viscosity is observed. When antioxidant is also present, a steady decrease in viscosity resulted as shown by the data in Table 5B.

TABLE 5B

| Additive, phr | | |
|---|---|---|
| MBFO | SANTOFLEX 13 | Mooney Vis., 100° |
| 0 | 0 | 47 |
| 0.5 | 0 | 54 |
| 1.0 | 0 | 59 |
| 1.5 | 0 | 65 |
| 2.5 | 0 | 67 |
| 0 | 2.0 | 45 |
| 1.0 | 2.0 | 30 |
| 2.0 | 2.0 | 23 |

While the invention has been described and exemplified herein by reference, specific materials, machinery, techniques, procedures and examples, it is understood that it is not restricted to any of these numerous variations, combinations, and permutations can be made within the scope of the invention as is clear to those skilled in the art.

What is claimed is:

1. A method of liquifying NR which comprises mixing therein a liquifying amount of at least one aromatic furazan oxide of the partial formula

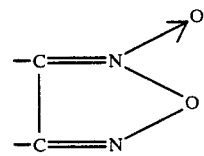

wherein the depicted carbon atoms are part of a second single fused aromatic ring.

2. The method of claim 1 for liquifying NR wherein the furazan oxide is a benzofurazan oxide of the formula

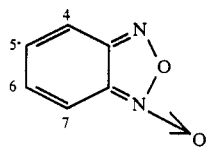

wherein none, one or any two of the ring positions 4, 5, 6, or 7 can be substituted with lower hydrocarbyl, hydroxyl halogen, lower hydrocarbyl oxy, lower hydrocarbyl thio, lower hydrocarbyl carbonyl, carbonyl lower hydrocarbyl oxy, nitro, amine or amino groups with balance substituted with hydrogen atoms and Y is a linking atom or group 3. The method of claim 2 wherein an anti-oxidant is also present.

* * * * *